(12) United States Patent
Wisniewski et al.

(10) Patent No.: US 11,948,222 B2
(45) Date of Patent: Apr. 2, 2024

(54) IMAGE WATERMARKING

(71) Applicant: SmartFrame Technologies Limited, London (GB)

(72) Inventors: Artur Wisniewski, Cracow (PL); Grzegorz Plech, Cracow (PL)

(73) Assignee: SMARTFRAME TECHNOLOGIES LIMITED, London (GB)

( * ) Notice: Subject to any disclaimer, the term of this patent is extended or adjusted under 35 U.S.C. 154(b) by 337 days.

(21) Appl. No.: 17/610,340

(22) PCT Filed: May 7, 2020

(86) PCT No.: PCT/GB2020/051125
§ 371 (c)(1),
(2) Date: Nov. 10, 2021

(87) PCT Pub. No.: WO2020/229798
PCT Pub. Date: Nov. 19, 2020

(65) Prior Publication Data
US 2022/0222766 A1    Jul. 14, 2022

(30) Foreign Application Priority Data
May 10, 2019   (GB) ..................................... 1906628

(51) Int. Cl.
*G06F 21/16*  (2013.01)
*G06F 21/10*  (2013.01)
(Continued)

(52) U.S. Cl.
CPC ............ *G06T 1/0085* (2013.01); *G06F 21/10* (2013.01); *G06F 21/16* (2013.01); *G06T 1/0028* (2013.01); *H04L 9/3247* (2013.01)

(58) Field of Classification Search
CPC ....... G06F 21/16; G06F 21/10; H04L 9/3247; H04L 9/3239; G06T 1/0085; G06T 1/0028
(Continued)

(56) References Cited

U.S. PATENT DOCUMENTS 5,734,752 A * 3/1998 Knox ................. H04N 1/32352
380/54
5,991,426 A  11/1999 Cox et al.
(Continued)

FOREIGN PATENT DOCUMENTS

EP            1843584 A1 * 10/2007  ............. H04N 5/913
WO  WO-2005027529 A1 *  3/2005  ............. H04N 5/913
(Continued)

OTHER PUBLICATIONS

United Kingdom Search Report for United Kingdom Application No. GB1906628.1, dated Oct. 11, 2019, (3 pages), United Kingdom Intellectual Property Office, South Wales, United Kingdom.
(Continued)

*Primary Examiner* — Samson B Lemma
(74) *Attorney, Agent, or Firm* — Alston & Bird LLP

(57) ABSTRACT

A method for the display of an image in a display area, the method comprising: loading a first image file defining a first image comprising a main image and a watermark image overlaying the main image using a first transformation; loading a second image file defining a second image comprising the main image and the watermark image overlaying the main image using a second transformation; and alternating between displaying the first image and the second image in a location within the display area so that the watermark image is imperceptible to a user viewing the display area.

23 Claims, 3 Drawing Sheets

(51) Int. Cl.
*G06T 1/00* (2006.01)
*H04L 9/32* (2006.01)

(58) Field of Classification Search
USPC ........................................................ 713/176
See application file for complete search history.

(56) References Cited

U.S. PATENT DOCUMENTS

| | | | | |
|---|---|---|---|---|
| 6,901,862 | B2* | 6/2005 | Yamaguchi | H04N 1/2112 101/483 |
| 8,160,308 | B2* | 4/2012 | Corcoran | G06T 7/90 382/117 |
| 9,022,292 | B1* | 5/2015 | van der Merwe | G06K 19/06037 235/383 |
| 9,251,760 | B2* | 2/2016 | Bracalente | H04N 5/913 |
| 11,461,436 | B1* | 10/2022 | Balmakhtar | G06F 21/6245 |
| 2004/0121131 | A1* | 6/2004 | Yamaguchi | H04N 1/32208 428/195.1 |
| 2010/0098288 | A1* | 4/2010 | Thiebaud | H04N 5/913 382/162 |
| 2015/0009248 | A1* | 1/2015 | Bracalente | G06F 21/16 345/691 |
| 2015/0194132 | A1* | 7/2015 | Ho | G09G 5/363 345/659 |
| 2016/0253772 | A1 | 9/2016 | Kofod et al. | |
| 2019/0261012 | A1* | 8/2019 | Hoarty | H04N 19/467 |

FOREIGN PATENT DOCUMENTS

| WO | WO-2010/062290 A1 | 6/2010 |
|---|---|---|
| WO | WO-2015/003031 A1 | 1/2015 |
| WO | WO-2016/014252 A1 | 1/2016 |
| WO | WO-2017/051152 A1 | 3/2017 |

OTHER PUBLICATIONS

International Searching Authority, International Search Report and Written Opinion for International Application No. PCT/GB2020/051125, dated Aug. 7, 2020, (14 pages), European Patent Office, Rijswijk, Netherlands.

* cited by examiner

IMAGE WATERMARKING

CROSS REFERENCE TO RELATED APPLICATIONS

This application is a National Stage Application, filed under 35 U.S.C. 371, of International Application No. PCT/GB2020/051125, filed May 7, 2020, which claims priority to and the benefit of United Kingdom Application No. 1906628.1, filed May 10, 2019; the contents of both of which as are hereby incorporated by reference in their entireties.

BACKGROUND

Related Field

This invention relates to a method for the display of an image in a display area and a method for preparing watermarked images.

Description of Related Art

It is increasingly common for media files, such as image files, video files and music files, to be shared over computer networks, in particular, the internet. Computer networks, and the internet in particular, have made it easier to share such media files. This ease of sharing has disadvantages for rights owners because it is more straightforward for someone with access to the media file, but without permission to distribute the media file, to share that media file with other people who wish to consume that media file. This can cause problems for the rights owners because the rights owners may wish to restrict access to the media files, or, at least, charge for access to it or charge for its use in particular circumstances.

This problem associated with the sharing of media files is particularly acute when the media files are images. This is because image files are easily displayed in internet browsers on web pages that make up the internet. They also tend to be publicly available for download from the servers that host the website. There are methods of restricting access to the image files so that they cannot be easily downloaded from the servers that host the website. One such method is described in WO2017/051152, the technical descriptions of which are incorporated by reference where permitted by law although the present application should be interpreted without reference to this document. However, there are still problems with someone taking a copy of the image file by a method that does not involve directly downloading from the server hosting the media file. For example, a user could take a screenshot of the current display of their device which could include a copy of the image.

The screenshot method described above may result in a lower quality version of the image than that available from download from the server hosting the website. It could result in a full quality version of the image. Either way, the user who has taken a copy of the image via a secondary means will obtain a copy of the image that they could then distribute without permission. It can then be difficult to determine where they obtained a copy of the image from and whether they received permission to distribute the image.

BRIEF SUMMARY

It is therefore desirable for these to be an improved method of protecting the display of image files to deter unauthorised use or distribution of those image files.

According to a first aspect of the present invention there is provided a method for the display of an image in a display area, the method comprising: loading a first image file defining a first image comprising a main image and a watermark image overlaying the main image using a first transformation; loading a second image file defining a second image comprising the main image and the watermark image overlaying the main image using a second transformation; and alternating between displaying the first image and the second image in a location within the display area so that the watermark image is imperceptible to a user viewing the display area.

According to a second aspect of the present invention there is provided a method for the display of an image in a display area, the method comprising: loading a main image file defining a main image; loading a watermark image file defining a watermark image; generating a first image file defining a first image comprising the main image and the watermark image by overlaying the watermark image onto the main image using a first transformation; generating a second image file defining a second image comprising the main image and the watermark image by overlaying the watermark image onto the main image using a second transformation, wherein the first transformation and second transformation alter the underlying main image with opposite image transformations; loading the first image file defining the first image comprising the main image and the watermark image overlaying the main image using the first transformation; loading the second image file defining the second image comprising the main image and the watermark image overlaying the main image using the second transformation; and alternating between displaying the first image and the second image in a location within the display area so that the watermark image is imperceptible to a user viewing the display area.

The first transformation may have adjusted the main image in regions where a watermark in the watermark image is present so that both the main image and the watermark are visible in the first image. The second transformation may have adjusted the main image in regions where a watermark in the watermark image is present so that both the main image and the watermark are visible in the second image. The first transformation may have adjusted image properties of the main image so that the watermark image is visible overlaying the main image when only the first image is displayed not alternating with the second image. The second transformation may have adjusted image properties of the main image so that the watermark image is visible overlaying the main image when only the second image is displayed not alternating with the first image.

The first transformation may have darkened regions of the main image where a watermark in the watermark image is present when overlaid on the main image, and the second transformation may have lightened regions of the main image where the watermark in the watermark image is present when overlaid on the main image. The second transformation may have lightened regions of the main image by the same amount that the first transformation darkened regions of the main image. The first and second transformations may be equal in magnitude but opposite in direction. The first image file may define the first image as a grid of pixels; the first transformation may have subtracted a respective predefined amount from one or more of a hue, saturation and luminosity value of individual pixels of the first image where a watermark of the watermark image is present when overlaid on the main image; and the second transformation may have added the respective predefined amount from one or more of a hue, saturation and luminosity value of individual pixels of the second image where a watermark of the watermark image is present when overlaid on the main image. The first image file may define the first image as a grid of pixels; the first transformation may have subtracted a respective determined amount from one or more of a red, green and blue component value of individual pixels of the first image where a watermark of the watermark image is present when overlaid on the main image; and the second transformation may have added the respective predefined amount from one or more of a red, green and blue component value of individual pixels of the second image where a watermark of the watermark image is present when overlaid on the main image. The display area may be displayed on a display screen of a user device, the display screen may have a refresh rate, and alternating between displaying the first image and the second image may comprise alternating between displaying the first image and the second image at the refresh rate of the display screen. Loading a first image file may comprise loading the first image into a first image frame in the display area; loading a second image file may comprise loading the second image into a second image frame in the display area; the first image frame and second image frame may have a visibility property; and alternating between displaying the first image and the second image may comprise switching between the first image frame having a visibility property of visible and the second image frame having a visibility property of visible.

Alternating between displaying the first image and the second image may comprise updating a framebuffer of a canvas layer to replace the content of the framebuffer with the alternative one of the first and second images.

The method may comprise receiving a command to take a screen capture of the display area, and pausing the alternation between displaying the first image and the second image during the screen capture so that only one of the first and second images is present in the screen capture.

According to a third aspect of the present invention there is provided a method for preparing watermarked images, the method comprising: loading a main image file defining a main image; loading a watermark image file defining a watermark image; generating a first image file defining a first image comprising the main image and the watermark image by overlaying the watermark image onto the main image using a first transformation; and generating a second image file defining a second image comprising the main image and the watermark image by overlaying the watermark image onto the main image using a second transformation; wherein the first transformation and second transformation alter the underlying main image with opposite image transformations.

The first transformation may comprise adjusting the main image in regions where a watermark in the watermark image is present so that both the main image and the watermark are visible in the first image. The second transformation may comprise adjusting the main image in regions where a watermark in the watermark image is present so that both the main image and the watermark are visible in the second image. The first transformation may comprise adjusting image properties of the main image so that the watermark image is visible overlying the main image in the first image. The second transformation may comprise adjusting image properties of the main image so that the watermark image is visible overlaying the main image in the second image.

The first transformation may comprise darkening regions of the main image where a watermark in the watermark image is present when overlaid on the main image, and the second transformation may comprise lightening regions of the main image where the watermark in the watermark image is present when overlaid on the main image. The second transformation may lighten regions of main image by the same amount that the first transformation darkens regions of the main image.

The main image file may define the main image as a grid of pixels; the first transformation may comprise subtracting a respective predefined amount from one or more of a hue, saturation and luminosity value of individual pixels of the main image where a watermark of the watermark image is present when overlaid on the main image; and the second transformation may comprise adding the respective predefined amount from one or more of a hue, saturation and luminosity value of individual pixels of the main image where a watermark of the watermark image is present when overlaid on the main image. The main image file may define the main image as a grip of pixels, each pixel may have a luminosity value associated with the pixel; and the first and second transformations may comprise selecting a pixel of the main image for transformation based on the luminosity value of the pixel.

The main image file may define the main image as a grid of pixels; the first transformation may comprise subtracting a respective determined amount from one or more of a red, blue and green value of individual pixels of the main image where a watermark of the watermark image is present when overlaid on the main image; and the second transformation may comprise adding the respective determined amount from one or more of a red, blue and green value of individual pixels of the main image where a watermark of the watermark image is present when overlaid on the main image. The first transformation may comprise determining the smaller of: (i) a respective predetermined amount, (ii) the red, green or blue component value of the pixel and (iii) a difference between a maximum level for the red, green or blue component value and the red, green or blue component value of the pixel and using the smallest as the determined amount for that component value for a respective pixel.

The main image file may define the main image as a grid of pixels; and the first and second transformations may comprise calculating a luminance value for a pixel and selecting the pixel of the main image for transformation based on the luminance value of the pixel. The main image file may define the main image as a grid of pixels, the watermark image file may define the watermark image as a grid of pixels, and the first and second transformations may comprise selecting a main image pixel for transformation when a watermark pixel overlaying a main image pixel indicates that a watermark is present in the watermark image.

The main image file may define the main image as a grid of pixels, the watermark image file may define the watermark image as a grid of pixels, and the first and second transformations may comprise selecting a main image pixel for transformation when a watermark pixel, that indicates that a watermark is present in the watermark image, overlaying a main image pixel matches predefined selection criteria. The watermark pixel may match predefined selection criteria when the watermark pixel is located a predefined interval within the grid of pixels of the watermark image.

BRIEF DESCRIPTION OF THE FIGURES

The present invention will now be described by way of example with reference to the accompanying drawings. In the drawings.

DETAILED DESCRIPTION OF VARIOUS EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for the display of an image in a display area, the method comprising loading a first image file defining a first image comprising a main image and a watermark image overlaying the main image using a first transformation, and loading a second image file defining a second image comprising the main image and the watermark image overlaying the main image using a second transformation. The method for the display of an image further comprising alternating between displaying the first image and the second image in a location within the display area so that the watermark image is imperceptible to a user viewing the display area. The present invention also relates to a method for preparing watermarked images, the method comprising loading a main image file defining a main image, and loading a watermark image file defining a watermark image. The method for preparing watermarked images further comprises generating a first image file defining a first image comprising the main image and the watermark image by overlaying the watermark image onto the main image using a first transformation, and generating a second image file defining a second image comprising the main image and the watermark image by overlaying the watermark image onto the main image using a second transformation. The first transformation and second transformation altering the underlying main image with opposite image transformations.

Figure 1:
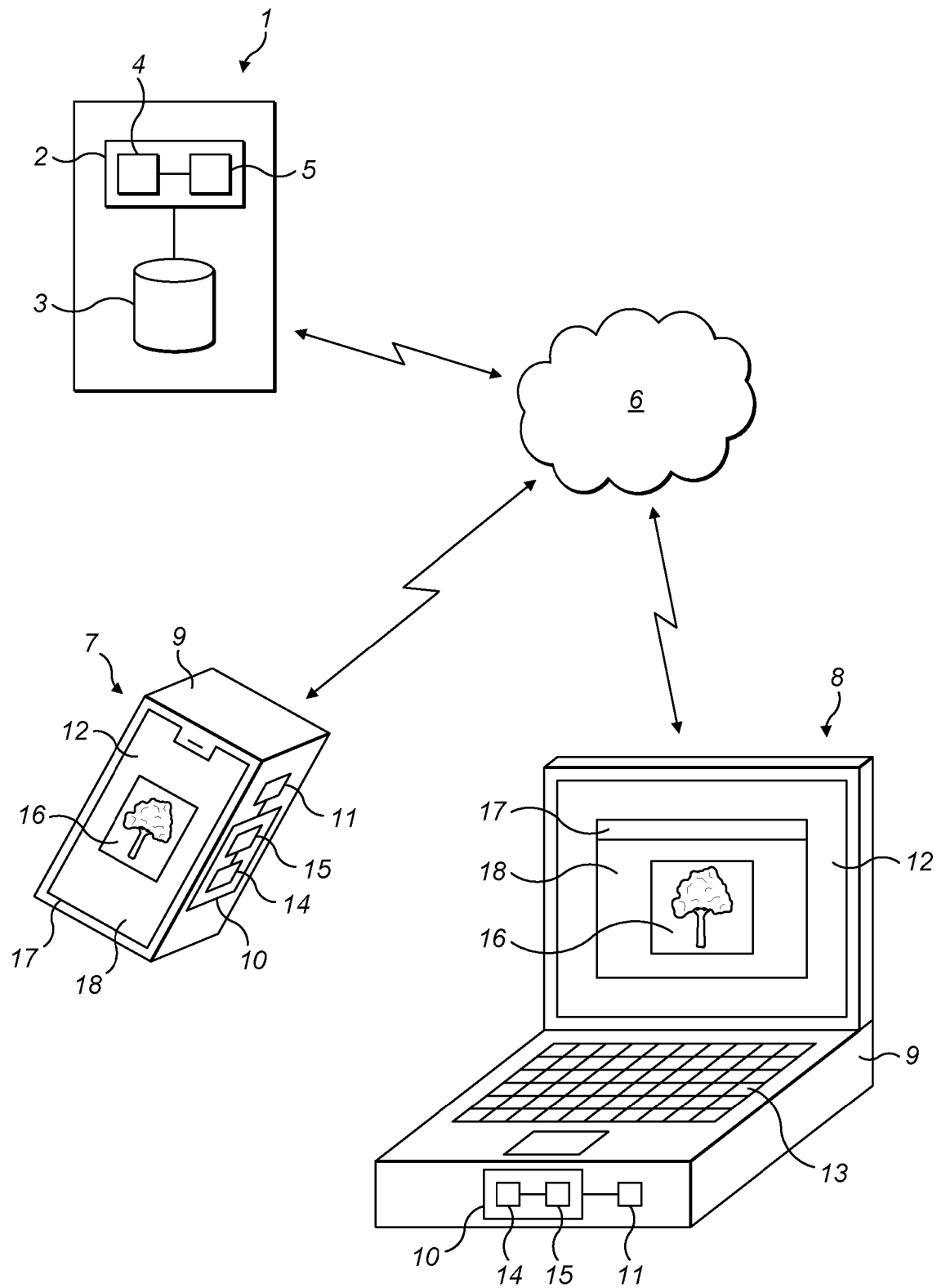
FIG. 1 shows an example system that implements the methods described herein.

FIG. 1 shows an example system that can permit the delivery and display of images in a display area of a device. The system comprises a server 1. It will be appreciated that whilst reference may be made to a single server 1, this server could be part of a cluster of servers or may be a virtual server running in a cloud-based, virtual environment. The server comprises a processing section 2 and a storage section 3. The server 1 is configured to implement methods described herein for processing image files and transmitting them to end-user devices. These methods can be implemented and controlled by the processing section 2. The processing section 2 could perform its methods using dedicated hardware, using a general purpose processor executing software code, or using a combination of the two. A processor 4 executes software code stored in a non-transient way in software memory 5 in order to perform its methods. The processing section can read/write data from/to storage location 3. The storage location 3 may be in the form of a memory. Storage location 3 may comprise non-volatile memory, may be in the form of an array of discrete banks of memory such as hard disks. Whilst shown in FIG. 1 as schematically being part of server 1, the storage location 3 may be separate to server 1 and connected to server 1. The above described image files may be stored in storage location 3. The methods undertaken by server 1 may be spilt across multiple servers. For instance, a first server may receive image files and send them for image processing by a second server. The second server may deliver the processed images to a third server from which an end-user device can access them.

The server 1 may be connected to a computer network 6 to permit the transmission of image files. Computer network 6 may be made up of many network segments that are connected together and so may be a large distributed network such as the internet or another public network.

Also connected to computer network 6 are a plurality of user terminals. User terminals may be a computer, such as a desktop or laptop computer; a portable device, such as a laptop, tablet computer or smartphone; or a smart TV or other device that can connect to remote servers using computer network 6 to access remote content located on servers such as server 1 to permit a user to send and receive information over computer network 6. In the example given in FIG. 1, two user terminals are shown, the first user device 7 being a smartphone 7 with the second user device 8 being a laptop 8. Typically, the user device 7, 8 will be located remote from the server 1 and may well be located in a different country or even on a different continent from the server 1.

As shown in FIG. 1, the first and second devices 7, 8 may comprise a housing 9. The first and second devices 7, 8 comprise a processing section 10 and a memory 11. The first and second devices comprise a user interface constituted by a display 12 and, shown in the case of second device 8, a series of user-actuable switches 13. The display and switches could be combined into a touchscreen device as shown by first device 7. The first and second devices 7, 8 may comprise a wireless communication device for communicating with computer network 6. The first and second devices 7, 8 may comprise a wired communication device for communicating with computer network 6.

The display screen 12 comprises a plurality of pixels. The pixels may be arranged in a grid. The display screen 12 may have a generally rectangular shape with the pixels arranged in a grid within that shape. As shown in FIG. 1, there may be some deviation from that rectangular shape as shown by the screen 12 of the smartphone 7. In any case, the display screen has a shape within which the pixels are arranged in a grid within that shape. The pixels that are present within the display screen 12 may be referred to as physical pixels. This is because they are each capable of physically displaying one pixel of colour on the display screen 12.

The device 7, 8 may be configured to display content on the screen. The content may have a defined number of pixels in each direction that describes the information that is to be displayed by that content. For instance, an image may have an image size which is defined as a grid of colour values in two dimensions, each of those colour values may be described as an image pixel. The device may be configured to display the content on the screen so that one physical pixel is used for each image pixel. In this case, the physical pixel density of the display area would have a value of 1.

Alternatively, the device may be configured to display content on the screen so that more than one physical pixel is used for each image pixel. There may not be an integer number of physical pixels used for each image pixel. For instance, the physical pixel density may be 1.5. In this case one and a half physical pixels would be used to display every image pixel of the content. If the physical pixel density is set to 2 then two physical pixels would be used to display every image pixel of the content.

The number of image pixels in each of the two dimensions that the display screen can display due to the physical pixel density may be defined as a number of logical pixels in each dimension. Each logical pixel can be used to display one image pixel of the content to be displayed but may physically be represented by one or more physical pixels depending on the physical pixel density current set by the device.

The first and second devices 7, 8 may be capable of implementing methods described herein display images on display screen 12. These methods may be implemented and controlled by the processing section 10. The processing section 10 could perform its methods using dedicated hardware, using a general purpose processor executing software code, or using a combination of the two. A processor 14 executes software code stored in a non-transient way in software memory 15 in order to perform its methods. The processing section can read/write data from/to memory 11. The memory 11 may be a storage location for data. Memory 11 may comprise non-volatile memory, may be in the form of an array of discrete banks of memory such as hard disks. Whilst shown in FIG. 1 as schematically being part of first and second devices 7, 8, the memory 11 may be separate to first and second devices 7, 8 and respectively connected to first and second devices 7, 8 by some means.

In FIG. 1, user device 8 is shown displaying an image file 16 within an internet browser window 17 using display 12. The internet browser window comprises a display area 18. The internet browser may use display area 18 for the display of webpages that have been accessed over the internet 6 or other computer network 6. The display area 18 may display content items 16 of which the image 16 may be one of them. Those content items 16 may have been received from server 1 over the communications network 6. The content items 16 that are displayed in the display area 18 and the way in which those content items 16 are displayed may be specified by code, stored on server 1, that may be interpreted by a user device 7, 8 to display those content items 16 on display area 18. The code may be in the form of a webpage. Such a webpage may be accessed by the internet browser 17.

First user device 7, analogously to second user device 8, is shown displaying an image file 16. In this case, the browser window 17 fills the display screen 12 of the first user device 7. The display area 18 therefore takes up most, if not all, of the space of display screen 12. The internet browser and display area operate in an analogous way to second user device 8.

Whilst traditionally internet browsers 17 may have been a separate application running on user device 7, 8, it will be appreciated that the term internet browser may encompass a part of another application that displays a webpage within that application. In this case the internet browser itself may be embodied by and/or be part of the other application. The area of the other application may then suitably be the display area 18 of the internet browser. In this way, another application may be capable of interpreting the code, stored on server 1, so as to display those content items 16 on display area 18. At least one of those content items may be an image file 16.

The improved method of display of images within the display area will now be described with reference to the figures.

Figure 2:
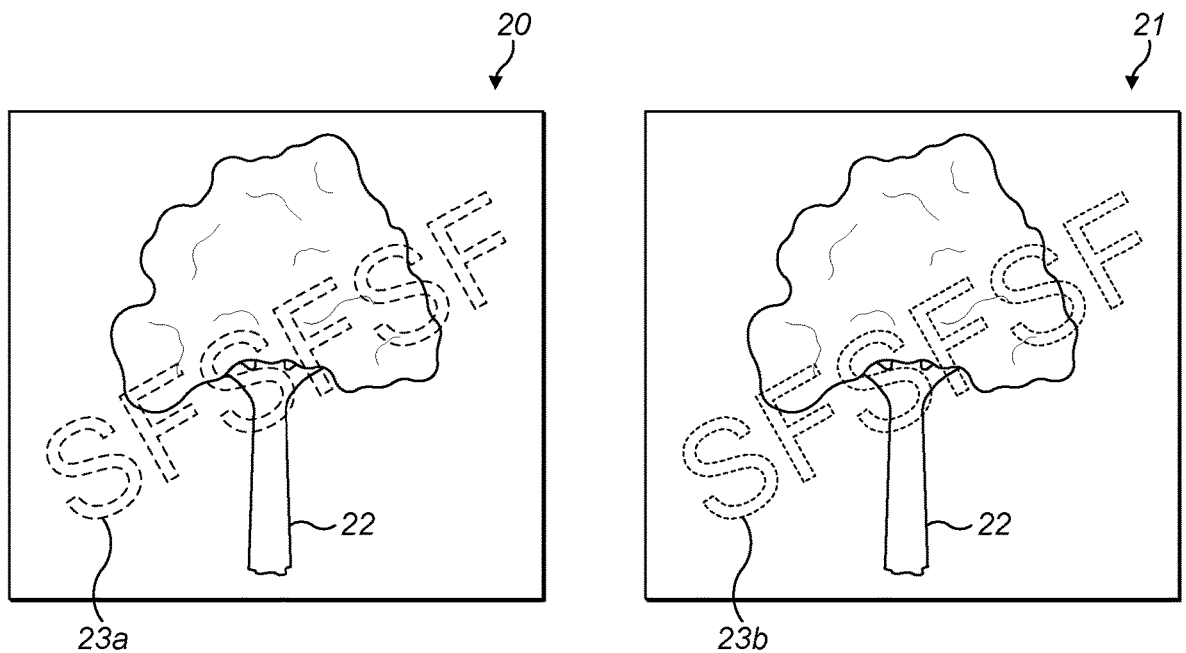
FIG. 2 shows two versions of an image that each comprise a main image and a watermark image.

FIG. 2 shows two versions of an image, a first image 20 and a second image 21. Each image 20, 21 comprises a main image 22, in the current example a drawing of a tree, and a watermark image 23, in the current example repeated SF characters. The watermark image 23 is overlaid on the main image. The watermark in the watermark image 23a in the first image 20 is shown with dashed outlines 23a whereas the watermark in the watermark image 23b in the second image is shown with dotted outlines 23b. This is because, whilst the watermark image 23 in the first and second images 20, 21 present the same visual information, the manner in which the watermark image 23 is overlaid in each of the two images 20, 21 is different. The first and second images 20, 21 have been prepared so that the watermark image 23 in each of the first and second images 20, 21 alters the underlying main image 22 with an opposite effect.

Figure 3:
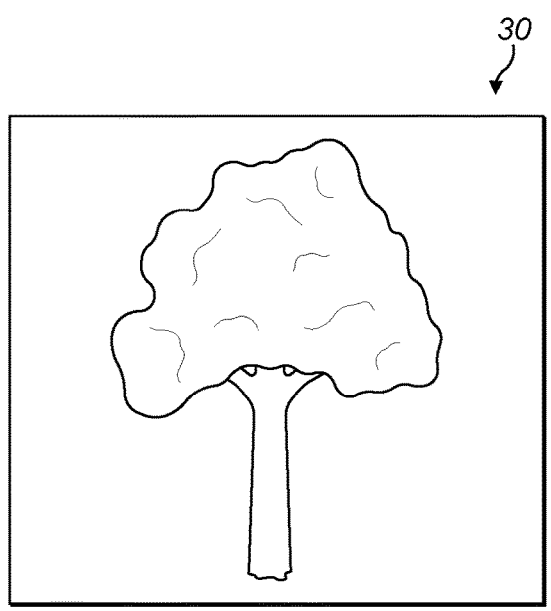
FIG. 3 shows the image perceived by a user when the two versions of the image are displayed in alternation.

The watermark image 23 has been overlaid on the main image 22 using a different transformation for each of the two images 20, 21. The transformation between the first and second images differs in that the transformations are the same in magnitude but opposite in direction. This means that if the two images are displayed in an alternating fashion in the same place in a display area 18 on a user device 7, 8 that the watermark 23 becomes imperceptible to a user looking at the images 20, 21. This makes use of the property of the human eye and brain that if two images are alternated quickly enough then the eye and brain processes those images as only one and so interprets the information received from the two images together to form one perceived image. The technique makes use of the temporal short-term memory of the brain to trick the brain into processing the two images together as one image because the images alternate between the two images too quickly for the brain to pick up that they are separate images. As the transformations used to overlay the watermarks in each of first and second images are opposite, the watermarks cancel each other out when the two images are viewed by the user in alternation. This is as shown in FIG. 3 which shows the image 30 perceived by the user when the first and second images are displayed in alternation at the same location within the display area 18.

If a screenshot is taken of the display area using the user device, this will capture one frame of the display 12. Only one of the first and second images is displayed at a time in the display area. This means that when one frame of the display 12 is captured, only one of the first and second images will be being displayed in the display area during that frame. This means that the screenshot will include the main image together with the overlaid watermark image. Thus, meaning any unauthorised copy of the image will include the watermark. As described herein, the watermark may provide identifying information about the owner of the image or the user who has access it. This means that the watermark can deter unauthorised use of the image whilst not being visible to a human viewer during normal viewing.

Figure 4:
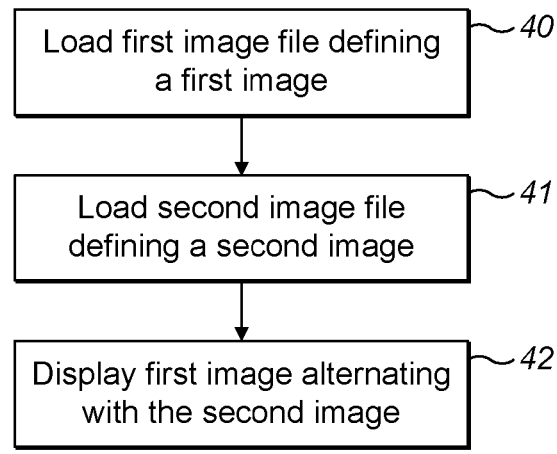
FIG. 4 shows a flow diagram of a method by which a main image can be displayed in a display area whilst a watermark image is imperceptible to a user viewing the display area.

FIG. 4 shows a flow diagram of the method by which a main image can be displayed in a display area whilst a watermark image is imperceptible to a user viewing the display area. It will be appreciated that whilst the steps are shown in the flow diagram in FIG. 4 in series, certain steps may be undertaken in parallel, for instance the loading of the first and second image files.

As shown in 40, the method for the display of an image comprises loading a first image file defining a first image 20.

The first image 20 comprises a main image 22 and a watermark image 23a. The watermark image 23a overlays the main image 22 using a first transformation. The first transformation adjusts the main image 22 in regions where the watermark in the watermark image 23a is present so that both the main image 22 and the watermark image 23a are visible in the first image 20. The first transformation may adjust only some of the main image 22 in regions where the watermark in the watermark image 23a is present. This is done so that the watermark in watermark image 23a is not overly visible in the main image and so assists in making it imperceptible when the first and second images are alternated.

The first transformation may have adjusted image properties of the main image 22 so that the watermark image 23a can be seen overlaying the main image 22. For instance, regions of the main image 22 where the watermark in the watermark image 23a is present may be lightened or darkened so that the watermark image 23a is visible in the main image.

As discussed herein, the main image 22 may be formed of pixels. The main image may use a RGB colour space to define the colours of each pixel in the image. The RGB colour space may use a non-linear gamma curve such as that used in the sRGB colour space. The main image may be converted to a linear RGB colour space using a gamma corrected reverse transformation. In a linear RGB colour space a linear gamma curve may be used. The linear RGB colour space may be a linear sRGB colour space.

Individual pixels may be lightened or darkened in dependence on whether the watermark in the watermark image 23a is present in the overlay of the watermark image 23a on to the main image 22. The colour represented by the individual pixels may be defined by the individual hue, saturation and luminosity values of the individual pixels. The first transformation may have subtracted or added a respective predefined amount to the one or more of the hue, saturation and luminosity values of the individual pixels of the main image 22 where the watermark is present in the overlay of the watermark image 23a on to the main image 22. The first transformation may have subtracted or added a different predefined amount to the one or more of the hue, saturation and luminosity values of the individual pixels of the main image 22 where the watermark image is present in the overlay of the watermark image 23a on to the main image 22. The colour represented by the individual pixels may be defined by a red (R) component value, green (G) component value, and a blue (B) component value of the individual pixels. The first transformation may have subtracted or added a determined amount to the one or more of the red component, green component and blue component values of the individual pixels of the main image 22 where the watermark image is present in the overlay of the watermark image 23a on to the main image 22. The first transformation may have subtracted or added a different determined amount to one or more of the red component value, green component value and blue component value of the individual pixels of the main image 22 where the watermark image is present in the overlay of the watermark image 23a on to the main image 22.

The first transformation is one that can be performed in reverse to produce a second transformation on the main image 22. The specific methods by which the main image 22 can be transformed by the overlay of the watermark image 23a are described herein with reference to the method of preparing watermarked images.

As shown in 41, the method for the display of an image comprises loading a second image file defining a second image 21. The second image 21 comprises a main image 22 and a watermark image 23b. The watermark image 23 present in the first and second images 20, 21 has the same shape and location in the first and second images 20, 21. The main image 22 present in the first and second images 20, 21 is the same image and has the same location in the first and second images. The watermark image 23b overlays the main image 22 using a second transformation. The second transformation adjusts the main image 22 in regions where the watermark in the watermark image 23b is present so that both the main image 22 and the watermark image 23b are visible in the second image 21. The second transformation may adjust only some of the main image 22 in regions where the watermark in the watermark image 23b is present. This is done so that the watermark image 23b is not overly visible in the main image and so assists in making it imperceptible when the first and second images are alternated.

The second transformation may have adjusted image properties of the main image 22 so that the watermark image 23b can be seen overlaying the main image 22. The second transformation that is applied to the overlay of the watermark 23b on the main image 22 is the opposite to the first transformation applied in the first image 20. For instance, regions of the main image 22 where the watermark in the watermark image 23b is present may be lightened or darkened so that the watermark image 23b is visible in the main image. If the first transformation has lightened the main image 22 then the second transformation will have darkened the main image 22 in the same region where the watermark in the watermark image 23 is present. If the first transformation has darkened the main image 22 then the second transformation will have lightened the main image 22 in the same region where the watermark in the watermark image 23 is present.

As discussed herein, the main image 22 may be formed of pixels and individual pixels may be lightened or darkened in dependence on whether the watermark in the watermark image 23a is present in the overlay of the watermark image 23a on to the main image 22. Again, where the first transformation has lightened or darkened a particular pixel then the second transformation will have done the opposite of lightening or darkening a particular pixel.

The colour represented by the individual pixels may be defined by the individual hue, saturation and luminosity values of the individual pixels. The second transformation may have subtracted or added a predefined amount to the one or more of the hue, saturation and luminosity values of the individual pixels of the main image 22 where the watermark in the watermark image is present in the overlay of the watermark image 23a on to the main image 22. If the first transformation subtracted or added a predefined amount to one or more of the hue, saturation and luminosity values then the second transformation will have done the opposite of subtracted or added. Where the first transformation has subtracted or added a different predefined amount to the one or more of the hue, saturation and luminosity values of the individual pixels of the main image 22 where the watermark image is present in the overlay of the watermark image 23a on to the main image 22, the second transformation has done the opposite of subtracted or added for that particular pixel.

The colour represented by the individual pixels may be defined by the individual red, green, and blue component values of the individual pixels. The second transformation may have subtracted or added a determined amount to the one or more of the red, green and blue component values of the individual pixels of the main image 22 where the watermark in the watermark image is present in the overlay of the watermark image 23a on to the main image 22. If the first transformation subtracted or added a determined amount to one or more of the red, green and blue component values then the second transformation will have done the opposite of subtracted or added. Where the first transformation has subtracted or added a different determined amount to the one or more of the red, green and blue component values of the individual pixels of the main image 22 where the watermark image is present in the overlay of the watermark image 23a on to the main image 22, the second transformation has done the opposite of subtracted or added for that particular pixel.

The specific methods by which the main image 22 can be transformed by the overlay of the watermark image 23b are described herein with reference to the method of preparing watermarked images.

As shown in 42, the method for the display of an image comprises the display of the first image alternating with the display of the second image. In other words, the method comprises alternating between displaying the first image and the second image. By alternating between displaying the first image and the second image the watermark image is imperceptible to a user viewing the display area. This is because the first and second transformations made to the main image so that the watermark image is visible in the first and second images alone cancel out when the images are viewed in quick alternating succession by a user. As discussed here, this makes use of the effect of tricking the temporal short-term memory of the brain into processing the two images together as one image. As the first and second transformations have applied opposing transformations to the underlying main image, when the brain processes the two images together the opposing transformations cancel out meaning that only the underlying main image is perceived by the end user. Thus, the watermark image is imperceptible to a user viewing the display area 18.

The method step shown in 42 is implemented so that when the user device that is implementing the method is commanded to take a screen capture of the information displayed on the screen of the user device the alternation between the first and second images is frozen so that only one of the first and second images is displayed. In other words, the method comprises pausing the alternation between the first and second images when a screen capture is taken of the first and second images.

The display area 18 is present on a user device 7, 8 as described herein. The alternation of the display of the first and second images 20, 21 happens as fast as the user device is able to. The method commands the user device to alternate between displaying the first and second images as fast as the user device is capable of doing so. The display screen 12 of the user device 7, 8 has a refresh rate. The refresh rate being the speed at which the display screen can update the content displayed on the display screen with new content. The user device 7, 8 is therefore usually able to alternate between the first and second images as fast as the refresh rate of the display screen. On most flat panel screens this is at least 60 Hz and on some flat panel screens can be as high as 120 Hz.

The method steps shown in FIG. 4 may be undertaken when a user controls a user device to visit a webpage using an internet browser that contains browser executable code that is configured to display an image within a display area. Therefore, the method for the display of an image may comprise loading browser executable code and processing the browser executable code to implement the method steps of the display of an image. The browser may support linear RGB colour space. In the case that the browser does not support a linear RGB colour space, the browser executable code may determine that the browser does not support a linear RGB colour space and in response to this determination apply a gamma corrected transformation before displaying image(s). The gamma corrected transformation may return the image(s) to a RGB colour space that uses a non-linear gamma curve such as that used in the sRGB colour space.

The visiting of the webpage comprises the user device requesting data from server 1. The browser executable code is interpreted by the internet browser 17 which causes the user device to request the first image file and second image file from the server 1. The user device may then receive the first image file and second image file in response to those requests. In response to receiving the first image file and the second image file, the browser executable code is interpreted by the internet browser to cause the first and second image files to be loaded into memory of the user device 7, 8. The first image comprised within the first image file and the second image comprised within the second image file may be rendered on to separate frames of the webpage being processed by the internet browser. Those frames may have the property of either being visible to the user or being hidden from the user at a given time.

The browser executable code may cause the internet browser to load each of the first and second images into separate ImageBitmap objects as defined by the HTML standard. As some internet browsers do not support the ImageBitmap object, the browser executable code may determine whether the internet browser does not support ImageBitmap objects and in response to this determination load each of the first and second images into separate ImageData objects as defined by the HTML standard. Both the ImageBitmap and ImageData objects represent underlying pixel data of an area of a Canvas element in a webpage. The ImageBitmap and ImageData objects have the property of either being visible to the user or being hidden from the user at a given time.

To alternate between the first and second images, the browser executable code may cause the internet browser to change the visibility property of the first image and second image so that only one is visible at a time and the visibility of the first and second images switches between the two images. The internet browser may be instructed by the browser executable code to switch between the two images as fast as possible. As described herein, that switching is generally limited by the refresh rate of the display screen of the user device.

The browser executable code may instruct the internet browser to update a framebuffer of a canvas layer in sync with the refresh rate of the screen of the user device. Each update of the framebuffer causes the internet browser to replace the content of the framebuffer with the alternative one of the first and second images. The browser executable code may instruct the internet browser to switch between the two images using a requestAnimationFrame function call as defined by the HTML standard. This instructs the browser to animate between the two frames holding respective first and second images and thus update the webpage between the first and second images as fast as possible. As described herein, this is likely to be at the refresh rate of the display screen 12 of the user device 7, 8. The first and second images are rendered to the same portion of the webpage so that they completely overlap and are aligned. This means that the main image in both the first and second images are aligned and overlap and that the watermark image in both the first and second images are aligned and overlap.

The advantage of using image frames, ImageBitmap objects and/or ImageData objects are that the internet browser has already rendered both of the first and second images into memory and so can switch between the two images rapidly.

The method for the display of an image may comprise pausing the alternation between the display of the first and second images when the user device 7, 8 receives a command to take a screen capture of the display shown on the display screen 12. The method may pause the alternation whilst the screen capture takes place. Alternatively, the user device may capture one frame of the display shown on the display screen which will necessarily comprise only one of the first and second images as they are being alternated.

The described method for the display of an image containing a watermark has the advantage of meaning that the watermark is imperceptible to the user during normal viewing, but when the user attempts to take a copy of the image using a screenshot or by downloading one or both of the first and second images files the watermark is present and visible in the image(s).

Other image processing may be undertaken on the image files before they are displayed in the display area. For instance, the image files may be scrambled so that unauthorised access is prevented or at least inhibited. Therefore, the image files may need to be unscrambled by the browser executable code prior to display in the display area. As described herein, the image scrambling and unscrambling may be undertaken using the methods described in WO2017/051152.

Figure 5:
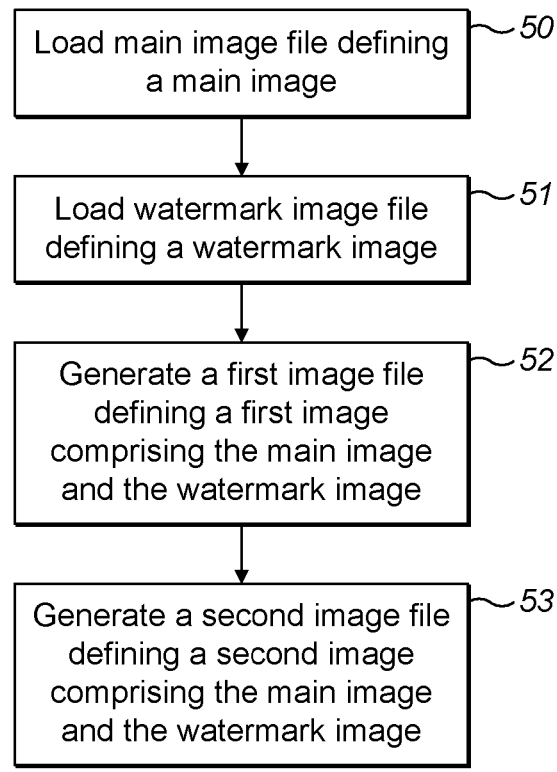
FIG. 5 shows a flow diagram of a method by which watermarked images are prepared.

FIG. 5 shows a flow diagram of the method by which the watermarked images are prepared. It will be appreciated that whilst the steps are shown in the flow diagram in FIG. 5 in series, certain steps may be undertaken in parallel, for instance the loading and processing of the image files.

As shown in 50, the method for preparing watermarked images comprises loading a main image file defining a main image 22. The main image 22 being an image that it is desired to be protected from unauthorised copying. The main image file may define the main image by reference to a grid of pixels that together make up the main image. Each pixel having a plurality of pixel properties associated with it. The pixel properties may be the colour values of the pixel, the colour saturation of the pixel, the colour hue of the pixel and/or the colour luminosity of the pixel. The main image file may be loaded from storage 3. The main image file may be requested and loaded from server 1 by a user device 7, 8. It may be being processed by server 1 or another processing device. The main image file may be being processed by a user device 7, 8.

The main image may use a RGB colour space to define the colours of each pixel in the image. The RGB colour space may use a non-linear gamma curve such as that used in the sRGB colour space. The main image may be converted to a linear RGB colour space using a gamma corrected reverse transformation. In a linear RGB colour space a linear gamma curve may be used. The linear RGB colour space may be a linear sRGB colour space.

As shown in 51, the method for preparing watermarked images comprises loading a watermark image file defining a watermark image 23. The watermark image 23 being an image that may provide information connected with the main image, for instance the rights holder of the main image or information about the device that downloaded the first and second image files. In the case of the watermark image 23 containing information about the device that downloaded the first and second image files, the watermark image 23 may be generated on the fly using data received from the request from the user device. The watermark image file may define the watermark image by marking whether the watermark is present or not present in each region of the watermark image. For instance, the watermark image file may define the watermark image in two colours. One colour designating the presence of the watermark in the watermark image and one colour designating the absence of the watermark in the watermark image. The watermark image file may be a black and white image. The black regions of the watermark image may define the presence of the watermark. The watermark image file may define the watermark image by reference to a grid of pixels that together mark up the watermark image. Each pixel may have one or more pixel properties associated with it. In the example that the watermark image file merely designates the presence or absence of the watermark in the watermark image, the pixels may have a pixel property which is the colour of the pixel. This may designate a 1-bit value for each pixel in the case that the watermark image has only two colours. The watermark image file may be loaded from storage 3 or generated based on information received associated with a request for the first and second image files. The watermark image file may be generated based on information derived from user device 7, 8. The watermark image file may be requested and loaded from server 1 It may be being processed by server 1 or another processing device. It may be processed by a user device 7, 8.

Advantageously, the watermark image and the main image are the same size and shape. This assists in the overlaying of the watermark image on to the main image as described herein.

As shown in 52, the method for preparing watermarked images comprises generating a first image file defining a first image. The first image comprises the main image and the watermark image. The generation of the first image file is by overlaying the watermark image onto the main image using a first transformation. The first transformation acts on the main image to overlay the watermark contained in the watermark image onto the main image. The overlaying of the watermark image on to the main image comprises aligning the main image with the watermark image so that the watermark image is directly on top of the main image. In the case that the main image and the watermark image comprise a grid of pixels, each pixel in the main image is aligned with a pixel in the watermark image.

The first transformation adjusts the main image 22 in regions where the watermark in the watermark image 23 is present. The first transformation may only adjust some of the main image 22 in regions where the watermark in the watermark image 23 is present. This may be done so that the watermark is not too strongly defined in the main image which can lead to problems with the imperceptibly of the watermark when the first and second images 20, 21 are alternated.

The first transformation may check the luminosity value of each pixel in the main image 22 and select the pixel for transformation based on the luminosity value of the pixel. The respective pixel in the main image may be selected for transformation if the luminosity of the pixel is above a minimum luminosity threshold value. The respective pixel in the main image may be selected for transformation if the luminosity of the pixel is below a maximum luminosity threshold value. The respective pixel in the main image may be selected for transformation if the luminosity of the pixel is between the minimum luminosity threshold value and the maximum luminosity threshold value. The minimum luminosity threshold value may be a luminosity value of 5%, 10%, 15% or 20% of the maximum luminosity value a pixel can have. Advantageously, the minimum luminosity threshold value is 10% of the maximum luminosity value a pixel can have. The maximum luminosity threshold value may be a luminosity value of 95%, 90%, 85% or 80% of the maximum luminosity value a pixel can have. Advantageously, the maximum luminosity threshold value is 90% of the maximum luminosity value a pixel can have.

The first transformation may calculate a luminance value for pixels in the main image 22 and select the pixel for transformation based on the luminance value of the pixel. The luminance value of a pixel may be calculated from the pixel properties of the pixel. For instance, the luminance value of a pixel may be calculated using the colour values of the pixel. Advantageously, the luminance value of a pixel may be calculated using the red, green and blue component values of the pixel. The luminance may be calculated as per ITU-R Recommendation BT. 709:

$$Y=0.2126R+0.7152G+0.0722B$$

where Y is the luminance, R is the red component value, G is the green component value and B is the blue component value. Ideally the red, green and blue component values are in linear RGB form. The respective pixel in the main image may be selected for transformation if the luminance of the pixel is above a minimum luminance threshold value. The respective pixel in the main image may be selected for transformation if the luminance of the pixel is below a maximum luminance threshold value. The respective pixel in the main image may be selected for transformation if the luminance of the pixel is between the minimum luminance threshold value and the maximum luminance threshold value. The minimum luminance threshold value may be a luminance value of 5%, 10%, 15% or 20% of the maximum luminance value a pixel can have. Advantageously, the minimum luminance threshold value is 10% of the maximum luminance value a pixel can have. The maximum luminance threshold value may be a luminance value of 95%, 90%, 85% or 80% of the maximum luminance value a pixel can have. Advantageously, the maximum luminance threshold value is 90% of the maximum luminance value a pixel can have.

The first transformation may check whether the watermark in the watermark image is present for each main image pixel selected based on the luminosity or luminance value of the main image pixel. The main image pixel is selected for transformation if the watermark in the watermark image is present for the respective main image pixel. This check may be based on whether the watermark image has a particular pixel colour for that pixel of the watermark image.

The first transformation may select a main image pixel for transformation based on whether the watermark pixel that contains the watermark matches predefined selection criteria. These selection criteria can be used to ensure that the overlay of the watermark on to the main image is not too strong so that it effects the perceptibility of the watermark when the first and second images are alternated. A watermark pixel may match the selection criteria if the watermark pixel is located at a predefined interval within the grid of pixels that form the watermark image. The predefined interval may vary depending on the row and/or column in which the pixel is located.

By way of example, a main image pixel may be selected for transformation if the corresponding watermark pixel contains the watermark and matches the following pseudo-code condition and thus passes the test:

```
if (y % density == 0) {
    if ((y / density) % 2 == 0 AND x % density == 0 ) {
        passes test;
    }
    if ((y / density) % 2 == 1 AND x % density == density / 2 {
        passes test;
    }
}
fails test;
``` where y and x are the two grid dimensions of the pixel grid forming the image, density is an inverse density factor that defines how far apart the pixels are that modified by the transformation and % is the modulo operation. The density factor may be 3, 4, 5, 6, 7, 8, 9 or 10.

For the selected main image pixels, the first transformation applies a transformation to those pixels. The first transformation may lighten or darken the selected pixels.

The colour represented by the individual pixels may be defined by the individual hue, saturation and luminosity values of the individual pixels of the main image. The first transformation may add or subtract a respective predefined amount to/from the one or more of the hue, saturation and luminosity values of the selected pixels of the main image. In one example the first transformation may subtract a respective predefined amount from one or more of the hue, saturation and luminosity values of the selected pixels of the main image. Advantageously, the first transformation may subtract a respective predefined amount from each of the hue, saturation and luminosity values of the selected pixels of the main image. The first transformation may subtract 0.5%, 1%, 1.5% or 2% of the maximum hue value from the hue value of the selected pixels of the main image. The first transformation may subtract 8%, 9%, 10%, 11% or 12% of the maximum saturation value from the saturation value of the selected pixels of the main image. The first transformation may subtract 3%, 4%, 5%, 6% or 7% of the maximum luminosity value from the luminosity value of the selected pixels of the main image.

The colour represented by the individual pixels may be defined by the individual red, green and blue component values of the individual pixels of the main image. Each component value may have a value between 0 and 255.

The first transformation may add or subtract a respective determined amount to/from the one or more of the red, green and blue component values of the selected pixels of the main image. In one example the first transformation may subtract a respective determined amount from one or more of the red, green and blue component values of the selected pixels of the main image. Advantageously, the first transformation may subtract a respective determined amount from each of the red, green and blue component values of the selected pixels of the main image.

The first transformation may subtract a respective predefined amount from each of the red, green and blue component values. As the red, green and blue component values have a finite range (e.g. between 0 and 255) for certain levels of the red, green and blue component values the predefined amount(s) would cause the red, green and/or blue component values to be out of range. Therefore, the first transformation may determine the smaller of the respective predefined amount, the red, green or blue component value and the difference between the maximum level for the red, green or blue component value and the red, green or blue component value of the pixel and use the smallest as the determined amount for that component value for a respective pixel. Stated another way, the determined amount may be the minimum value of the respective predefined amount, the red, green or blue component value of the pixel and the difference between the maximum level for the red, green or blue component value and the red, green or blue component value pixel. The respective determined amount can then be subtracted from the respective red, green or blue component value. The predefined amount for the red, green and blue component values may be different. The predefined amount for the red component values may be 75, 100 or 125. The predefined amount for the green component values may be 25, 50, or 75. The predefined amount for the red component values may be 75, 100 or 125.

The first transformation may determine whether the individual pixels are achromatic. This is to limit luminance variations which may cause unwanted flickering effects. The first transformation may determine that a pixel is achromatic by comparing the highest of the red, green and blue component values with the lowest of the red, green and blue component values and if the two values within a predefined amount of each other then determining that the pixel is achromatic. For instance, the first transformation may subtract the lowest of the red, green and blue component values from the highest of the red, green and blue component values and if the difference is lower than a threshold difference then determine that the pixel is achromatic. In response to this determination that the pixel is achromatic, determined amount by which the red, green and/or blue component values are adjusted in the first transformation may be set to zero. In response to this determination that the pixel is achromatic, determined amount by which the green component value is adjusted in the first transformation may be set to zero. The green component value may be chosen because of its dominance in the luminance calculation.

Once the transformation has been made to the main image based on the watermark image, the first image file may be stored. In response to a request for the first image file, the server 1 may send the first image file to the requesting device. Alternatively, the user device 7, 8 may have made the transformation itself and so stores the transformed first image file until it is needed to be displayed.

As shown in 53, the method for preparing watermarked images comprises generating a second image file defining a second image. The second image comprises the main image and the watermark image. The generation of the second image file is by overlaying the watermark image onto the main image using a second transformation. The second transformation acts on the main image to overlay the watermark contained in the watermark image onto the main image. The overlaying of the watermark image on to the main image comprises aligning the main image with the watermark image so that the watermark image is directly on top of the main image. In the case that the main image and the watermark image comprise a grid of pixels, each pixel in the maim image is aligned with a pixel in the watermark image.

The second transformation alters the underlying main image with the opposite image transformation to the first transformation. The second transformation therefore applies the same transformation as the first transformation but in reverse. The second transformation is therefore equal in magnitude to the first transformation but opposite in direction. So, if the first transformation lightened a region of the main image the second transformation would darken the same region of the main image and vice versa. Where particular pixel parameters of the pixels are adjusted the second transformation applies a negative version of the adjustment made by the first transformation. So, where the first transformation subtracts a respective predefined amount from each of the hue, saturation and luminosity values of the selected pixels of the main image, the second transformation adds a respective predefined amount to each of the hue, saturation and luminosity values of the selected pixels of the main image. Where the first transformation subtracts a respective determined amount from each of the red, green and blue component values of the selected pixels of the main image, the second transformation adds a respective determined amount to each of the red, green and blue component values of the selected pixels of the main image. The opposite also applies. The second transformation may add 0.5%, 1%, 1.5% or 2% of the maximum hue value to the hue value of the selected pixels of the main image. The second transformation may add 8%, 9%, 10%, 11% or 12% of the maximum saturation value to the saturation value of the selected pixels of the main image. The first transformation may add 3%, 4%, 5%, 6% or 7% of the maximum luminosity value to the luminosity value of the selected pixels of the main image. The second transformation may determine the amount to add to a respective red, green or blue component value using the same methodology described with respect to the first transformation.

The selection of which pixels to change in the main image is the same as for the first transformation and thus the description of that selection with reference to the first transformation applies equally to the second transformation. It is important that the same pixels in the main image are selected by both the first and second transformations so that when the first and second images are alternated the adjusted regions of the main image are aligned between the first and second images.

Once the transformation has been made to the main image based on the watermark image, the second image file may be stored. In response to a request for the second image file, the server 1 may send the second image file to the requesting device. Alternatively, the user device 7, 8 may have made the transformation itself and so stores the transformed first image file until it is needed to be displayed.

The watermark in the watermark image may take the form of detectable visual information. The watermark may be one or more of:

A logo. E.g. a company or individual logo.

A timestamp. The timestamp may be associated with when the watermarked image was generated, when the first and second images were requested from the server on which they are stored, and/or when the watermarked images were generated by the user device.

An identifier of the device requesting the first and second images. E.g. a network address of the device requesting the first and second images. The network address may be an IP address.

An identifier of the device generating the first and second images. E.g. a network address of the device generating the first and second images. The network address may be an IP address.

An identifier of the server on which the first and second images are stored. E.g. a network address of the server on which the first and second images are stored. The network address may be an IP address.

The method described with reference to FIG. 5 may be undertaken by the user device prior to undertaking the method described with reference to FIG. 4. The user device would therefore generate the first and second image files that contain the watermark and then move on to the loading step of FIG. 4. The method steps shown in FIG. 5 may be undertaken when a user controls a user device to visit a webpage using an internet browser that contains browser executable code that is configured to generate the watermarked images and then display an image within a display area. Therefore, the method for the preparation of watermarked images may comprise loading browser executable code and processing the browser executable code to implement the method steps of preparing watermarked images.

Other image processing may be undertaken on the image files before they are made available for access by the end user. For instance, the image files may be scrambled so that unauthorised access is prevented or at least inhibited. As described herein, the image scrambling and unscrambling may be undertaken using the methods described in WO2017/051152.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer implemented method using at least one hardware processor for the display of an image in a display area on the display screen, the method comprising:
   loading a first image file defining a first image comprising a main image comprising a grid of pixels and a watermark image comprising a grid of pixels, the watermark image overlaying the main image using a first transformation;
   loading a second image file defining a second image comprising the main image comprising a grid of pixels and the watermark image comprising a grid of pixels, the watermark image overlaying the main image using a second transformation; and
   alternating between displaying the first image and the second image in a location within the display area at refresh rate of the display screen so that the watermark image is imperceptible to a user viewing the display area;
   wherein:
   the first and second transformations comprise selecting a main image pixel for transformation when a watermark pixel, that indicates that a watermark is present in the watermark image, overlaying a main image pixel matches predefined selection criteria; and
   the watermark pixel matches predefined selection criteria when the watermark pixel is located a predefined interval within the grid of pixels of the watermark image.

2. The computer implemented method according to claim 1, wherein the first transformation adjusted the main image in regions where a watermark in the watermark image is present so that both the main image and the watermark are visible in the first image.

3. The computer implemented method according to claim 1, wherein the second transformation adjusted the main image in regions where a watermark in the watermark image is present so that both the main image and the watermark are visible in the second image.

4. The computer implemented method according to claim 1, wherein the first transformation adjusted image properties of the main image so that the watermark image is visible overlaying the main image when only the first image is displayed not alternating with the second image; and the second transformation adjusted image properties of the main image so that the watermark image is visible overlaying the main image when only the second image is displayed not alternating with the first image.

5. The computer implemented method according to claim 1, wherein the first transformation darkened regions of the main image where a watermark in the watermark image is present when overlaid on the main image, and the second transformation lightened regions of the main image where the watermark in the watermark image is present when overlaid on the main image.

6. The computer implemented method according to claim 5, wherein the second transformation lightened regions of the main image by the same amount that the first transformation darkened regions of the main image.

7. The computer implemented method according to claim 1, wherein the first and second transformations are equal in magnitude but opposite in direction.

8. The computer implemented method according to claim 1, wherein the first image file defines the first image as a grid of pixels; the first transformation subtracted a respective predefined amount from one or more of a hue, saturation and luminosity value of individual pixels of the first image where a watermark of the watermark image is present when overlaid on the main image; and the second transformation added the respective predefined amount from one or more of a hue, saturation and luminosity value of individual pixels of the second image where a watermark of the watermark image is present when overlaid on the main image.

9. The computer implemented method according to claim 1, wherein the first image file defines the first image as a grid of pixels; the first transformation subtracted a respective determined amount from one or more of a red, green and blue component value of individual pixels of the first image where a watermark of the watermark image is present when overlaid on the main image; and the second transformation added the respective predefined amount from one or more of a red, green and blue component value of individual pixels of the second image where a watermark of the watermark image is present when overlaid on the main image.

10. The computer implemented method according to claim 1, wherein loading a first image file comprises loading the first image into a first image frame in the display area; loading a second image file comprises loading the second image into a second image frame in the display area; the first image frame and second image frame having a visibility property; and alternating between displaying the first image and the second image comprises switching between the first image frame having a visibility property of visible and the second image frame having a visibility property of visible.

11. The computer implemented method according to claim 1, the method comprising receiving a command to take a screen capture of the display area, and pausing the alternation between displaying the first image and the second image during the screen capture so that only one of the first and second images is present in the screen capture.

12. A computer implemented method using at least one hardware processor, for preparing watermarked images, the method comprising:

loading a main image file defining a main image, the main image file defining the main image as a grid of pixels;

loading a watermark image file defining a watermark image, the watermark image file defining the watermark image as a grid of pixels;

generating a first image file defining a first image comprising the main image and the watermark image by overlaying the watermark image onto the main image using a first transformation; and generating a second image file defining a second image comprising the main image and the watermark image by overlaying the watermark image onto the main image using a second transformation;

wherein:

the first transformation and second transformation alter the underlying main image with opposite image transformations; the first and second transformations comprise selecting a main image pixel for transformation when a watermark pixel, that indicates that a watermark is present in the watermark image, overlaying a main image pixel matches predefined selection criteria; and the watermark pixel matches predefined selection criteria when the watermark pixel is located a predefined interval within the grid of pixels of the watermark image.

13. The computer implemented method according to claim 12, wherein the first transformation comprises adjusting the main image in regions where a watermark in the watermark image is present so that both the main image and the watermark are visible in the first image; and the second transformation comprises adjusting the main image in regions where a watermark in the watermark image is present so that both the main image and the watermark are visible in the second image.

14. The computer implemented method according to claim 12, wherein the first transformation comprises adjusting image properties of the main image so that the watermark image is visible overlying the main image in the first image; and the second transformation comprises adjusting image properties of the main image so that the watermark image is visible overlying the main image in the second image.

15. The computer implemented method according to claim 12, wherein the first transformation comprises darkening regions of the main image where a watermark in the watermark image is present when overlaid on the main image, and the second transformation comprises lightening regions of the main image where the watermark in the watermark image is present when overlaid on the main image.

16. The computer implemented method according to claim 15, wherein the second transformation lightens regions of main image by the same amount that the first transformation darkens regions of the main image.

17. The computer implemented method according to claim 12, wherein the main image file defines the main image as a grid of pixels; the first transformation comprises subtracting a respective predefined amount from one or more of a hue, saturation and luminosity value of individual pixels of the main image where a watermark of the watermark image is present when overlaid on the main image; and the second transformation comprises adding the respective predefined amount from one or more of a hue, saturation and luminosity value of individual pixels of the main image where a watermark of the watermark image is present when overlaid on the main image.

18. The computer implemented method according to claim 12, wherein the main image file defines the main image as a grid of pixels, each pixel having a luminosity value associated with the pixel; and the first and second transformations comprise selecting a pixel of the main image for transformation based on the luminosity value of the pixel.

19. The computer implemented method according to claim 12, wherein the main image file defines the main image as a grid of pixels; the first transformation comprises subtracting a respective determined amount from one or more of a red, blue and green value of individual pixels of the main image where a watermark of the watermark image is present when overlaid on the main image; and the second transformation comprises adding the respective determined amount from one or more of a red, blue and green value of individual pixels of the main image where a watermark of the watermark image is present when overlaid on the main image.

20. The computer implemented method according to claim 19, wherein the first transformation comprises determining the smaller of: (i) a respective predetermined amount, (ii) the red, green or blue component value of the pixel and (iii) a difference between a maximum level for the red, green or blue component value and the red, green or blue component value of the pixel and using the smallest as the determined amount for that component value for a respective pixel.

21. The computer implemented method according to claim 12, wherein the main image file defines the main image as a grid of pixels; and the first and second transformations comprise calculating a luminance value for a pixel and selecting the pixel of the main image for transformation based on the luminance value of the pixel.

22. The computer implemented method according to claim 12, wherein the main image file defines the main image as a grid of pixels, the watermark image file defines the watermark image as a grid of pixels, and the first and second transformations comprise selecting a main image pixel for transformation when a watermark pixel overlaying a main image pixel indicates that a watermark is present in the watermark image.

23. A computer implemented method using at least one hardware processor, for the display of an image in a display area, the method comprising:

loading a main image file defining a main image, the main image file defining the main image as a grid of pixels;

loading a watermark image file defining a watermark image, the watermark image file defining the watermark image as a grid of pixels;

generating a first image file defining a first image comprising the main image and the watermark image by overlaying the watermark image onto the main image using a first transformation;

generating a second image file defining a second image comprising the main image and the watermark image by overlaying the watermark image onto the main image using a second transformation, wherein the first transformation and second transformation alter the underlying main image with opposite image transformations; the first and second transformations comprise selecting a main image pixel for transformation when a watermark pixel, that indicates that a watermark is present in the watermark image, overlaying a main image pixel matches predefined selection criteria; and the watermark pixel matches predefined selection criteria when the watermark pixel is located a predefined interval within the grid of pixels of the watermark image;

loading the first image file defining the first image comprising the main image and the watermark image overlaying the main image using the first transformation;

loading the second image file defining the second image comprising the main image and the watermark image overlaying the main image using the second transformation; and alternating between displaying the first image and the second image in a location within the display area so that the watermark image is imperceptible to a user viewing the display area.

* * * * *